(12) United States Patent
Eissler et al.

(10) Patent No.: US 9,575,340 B2
(45) Date of Patent: Feb. 21, 2017

(54) ELECTRODE CONFIGURATION FOR ELECTRO-OPTIC MODULATORS

(71) Applicant: II-VI Incorporated, Saxonburg, PA (US)

(72) Inventors: Elgin Eissler, Renfrew, PA (US); Gary Herrit, Butler, PA (US); Stephen Rummel, Sarver, PA (US); Wen-Qing Xu, Saxonburg, PA (US); Travis Miller, Butler, PA (US)

(73) Assignee: II-VI Incorporated, Saxonburg, PA (US)

( * ) Notice: Subject to any disclaimer, the term of this patent is extended or adjusted under 35 U.S.C. 154(b) by 0 days.

(21) Appl. No.: 15/050,818

(22) Filed: Feb. 23, 2016

(65) Prior Publication Data

US 2016/0246080 A1    Aug. 25, 2016

Related U.S. Application Data

(60) Provisional application No. 62/119,987, filed on Feb. 24, 2015.

(51) Int. Cl.

| | |
|---|---|
| *G02F 1/03* | (2006.01) |
| *B28B 19/00* | (2006.01) |
| *B05D 5/12* | (2006.01) |
| *G02F 1/00* | (2006.01) |
| *G02F 1/01* | (2006.01) |

(Continued)

(52) U.S. Cl.
CPC .......... *G02F 1/0316* (2013.01); *G02F 1/0018* (2013.01); *G02F 1/0054* (2013.01); *G02F 1/0063* (2013.01); *G02F 1/0136* (2013.01); *G02F 1/03* (2013.01); *G02F 1/19* (2013.01); *G02F 1/292* (2013.01)

(58) Field of Classification Search
CPC ........ G02F 1/03; G02F 1/0316; G02F 1/0322; G02F 1/0327; G02F 1/133504; G02F 1/155; G02F 1/19; G02F 1/292
USPC ... 359/245, 246, 254, 256; 427/58, 64, 96.2, 427/96.4; 250/461.1
See application file for complete search history.

(56) References Cited

U.S. PATENT DOCUMENTS

| | | |
|---|---|---|
| 3,663,091 A | 5/1972 | Lee |
| 3,900,246 A | 8/1975 | Kimura et al. |
| 4,655,554 A | 4/1987 | Armitage |

(Continued)

OTHER PUBLICATIONS

Harada, Kenji et al., "Spatial Light Modulators and Surface Relief Gratings Using an Electrooptic Polymer", Photonics Based on Wavelength Integration and Manipulation, IPAP Books 2 (2005), pp. 187-192.

(Continued)

*Primary Examiner* — Loha Ben
(74) *Attorney, Agent, or Firm* — Wendy W. Koba

(57) ABSTRACT

An electro-optic modulator for high voltage applications exhibits reduced corona and arcing by utilizing dielectric-coated electrodes in conjunction with a non-centrosymmetric crystal. The inclusion of an insulative coating (i.e., a dielectric material) on at least a portion of the electrodes reduces the possibility of arcing or corona, without requiring the application of any type of coating material directly on the crystal itself. Thus, the birefringent response of the crystal is not impacted by this coated electrode configuration of the present invention. In one configuration, the exposed surfaces of the electrodes are coated with an insulative material, while maintaining a direct contact between the electrodes and the surface of the crystal.

14 Claims, 4 Drawing Sheets

(51) Int. Cl.
  *G02F 1/19* (2006.01)
  *G02F 1/29* (2006.01)

(56) References Cited

U.S. PATENT DOCUMENTS

| | | | |
|---|---|---|---|
| 4,849,719 | A | 7/1989 | Belek et al. |
| 4,894,724 | A * | 1/1990 | Welkowsky ............ H04N 5/33 348/762 |
| 5,214,724 | A | 5/1993 | Seino et al. |
| 5,600,480 | A | 2/1997 | Chien et al. |
| 7,099,069 | B2 | 8/2006 | Zappettini et al. |
| 7,123,796 | B2 * | 10/2006 | Steckl .................... G02B 26/02 362/601 |
| 7,280,569 | B2 | 10/2007 | Laughman et al. |
| 7,430,355 | B2 * | 9/2008 | Heikenfeld ............ G02B 26/02 362/600 |
| 8,422,114 | B2 * | 4/2013 | Hashimura ............... G02F 1/19 359/290 |
| 8,470,388 | B1 * | 6/2013 | Zsinko ................... H05B 33/10 427/64 |
| 8,867,120 | B2 * | 10/2014 | O'Keeffe ................ G02F 1/167 264/4.7 |
| 2003/0062551 | A1 | 4/2003 | Chen |
| 2004/0240036 | A1 | 12/2004 | Porte et al. |
| 2008/0002751 | A1 | 1/2008 | Hua et al. |
| 2015/0221812 | A1 | 8/2015 | Reese et al. |

OTHER PUBLICATIONS

Thakur, M., et al., "Electro-Optic Modulation at 1.5 GHz using Single-Crystal Film of an Organic Molecular Salt", Applied Physics Letters, vol. 81, No. 20, Nov. 11, 2002, pp. 3738-3740.

* cited by examiner

ELECTRODE CONFIGURATION FOR ELECTRO-OPTIC MODULATORS

CROSS-REFERENCE TO RELATED APPLICATIONS

This application claims the benefit of U.S. Provisional Application Ser. No. 62/119,987, filed Feb. 24, 2015 and hereby incorporated by reference.

TECHNICAL FIELD

The present invention relates to electro-optic modulators and, more particularly, to the inclusion of a specific type of coating on at least a portion of the modulator's electrodes to reduce arcing and other unwanted effects resulting from operation at high voltages.

BACKGROUND

It is well known in the art that a laser beam can be modulated using non-centrosymmetric electro-optic single crystal materials, such as CdTe (i.e., materials that exhibit a linear electro-optic effect). When an electric field is applied to the crystal, internal birefringence is created that causes a rotation of the polarization direction of the crystal material. When the crystal is positioned between a polarizing element and an optical analyzer, the amplitude of the exiting beam is proportional to the electric field applied to the crystal. Thus, modulation of the applied electric field (such as by pulsing the voltage applied across the crystal) provides a modulated optical output signal.

In practice, conductive layers are applied to the crystal, which are then contacted by the electrodes used to apply the voltage across the crystal. The conductive layers are utilized to out-couple heat and acoustic energy away from the crystal, while also providing the necessary electrical contact between the high voltage source and the surface of the crystal.

It is known that the voltages used to create the electric field within the crystal may exceed upwards of 3000V (depending on the design thickness of the crystal), which can produce undesirable arcing and corona that may ultimately destroy the crystal. For example, presuming that a crystal having a thickness of 5 mm is used as the modulator, an applied voltage on the order of 6000 volts (1200 volts/mm) is required to produce a full rotation of the polarization state within the crystal. Experience has shown that corona will form at this electric field intensity, eventually leading to arcing. Once the voltage exceeds about 7000 volts, arcing will occur instantly. Corona is known to be corrosive in nature, as a result of its high discharge temperature and formation of ozone and, therefore, a source of damage to the modulator structure.

While many "high voltage" electronic circuits may be fully immersed in a potting material to prevent corona formation and arcing, that is not possible when using birefringent elements such as crystal, material CdTe, since the various mechanical stresses associated with the potting process creates an unknown, amount of stress-induced birefringence within the crystal. This variable (and uncontrollable) amount of polarization shifting significantly degrades the ability of the configuration to operate as an optical modulator.

Thus, a need remains in the art for an electro-optic modulator that is protected from arcing and corona problems.

SUMMARY OF THE INVENTION

The needs remaining in the prior art are addressed by the present invention, which relates to electro-optic modulators based and, more particularly, to the inclusion of a specific type of coating on at least a portion of the modulator's electrodes to reduce arcing and other unwanted effects resulting from operation at high voltages.

In accordance with the present invention, the inclusion of an insulative coating (i.e., a dielectric material) on at least a portion of the electrodes reduces the possibility of arcing or corona, without requiring the application of any type of coating material directly on the crystal itself or encapsulating ("potting") the entire modulator structure. Thus, the birefringent response of the crystal is not impacted by this coated electrode configuration of the present invention.

In one embodiment, the exposed surfaces of the electrodes are coated with an insulative material, while maintaining a direct contact between the electrode and the surface of the crystal.

In another embodiment, each electrode is completely coated, creating a capacitive-based coupling between the electrodes and the crystal.

Yet another embodiment uses a combination of coated and uncoated connections between the electrodes and the crystal.

One particular embodiment takes the form of an electro-optic modulator comprising a non-centrosymmetric crystal (having opposing major surfaces) that exhibits changes in internal birefringence in response to an applied voltage and electrodes coupled to the opposing major surfaces of the non-centrosymmetric crystal with at least one electrode including a dielectric coating over at least a portion of its external surface, the coating of a thickness sufficient to reduce arcing in the presence of voltages in excess of 1000 volts.

Other and further embodiments and aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
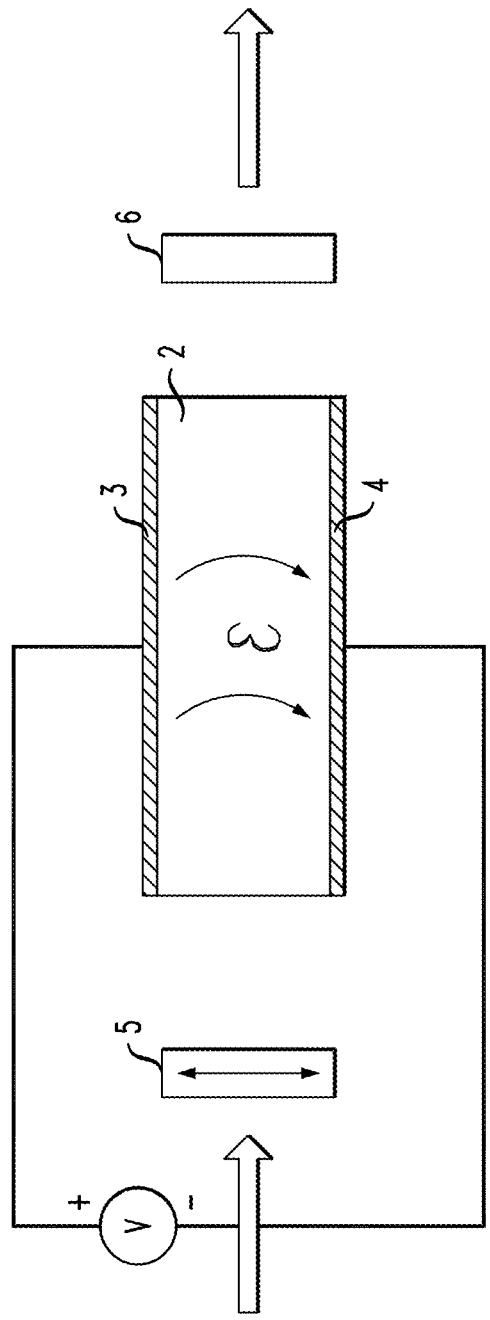
FIG. 1 is a simplified diagram of a typical prior art high-voltage electro-optic modulator.

Prior to describing the novel aspects of the present invention, the operation of a conventional electro-optic modulator is briefly reviewed. A simplified diagram of the main components of a conventional electro-modulator 1 is shown in FIG. 1. The operation of electro-optic modulator 1 is based on a birefringent crystal element 2 (where CdTe is a preferred crystal for today's $CO_2$ laser-based systems). Electrodes 3 and 4 are disposed across opposing major surfaces (i.e., "top" and "bottom") on either side of crystal element 2, as shown, where the presence of a voltage between the electrodes creates an electric field E across crystal element 2. When an electric field is present, internal birefringence is created and causes a rotation of the polarization direction of the crystal. As a result, an optical signal propagating through the crystal will undergo a polarization transformation as it progresses from the input to the output of the crystal.

In the configuration of FIG. 1, crystal element 2 is positioned between a first polarizing element 5 and a second polarizing element 6, where the polarization state of second element 6 is rotated 90° with respect to first element 5 (at times, second element 6 is referred to as an "analyzer"). An input optical signal first passes through polarizing, element 5 so that a signal of a "known" polarization state is created. The polarized signal then passes through crystal 2 and is rotated through a predetermined polarization angle proportional to the electric field in crystal element 2. The amplitude of the optical signal exiting second polarizing element 6 will thus be a function of the electric field applied to crystal 2 (i.e., indicative of the orientation between the polarized input signal and the electric field-induced polarization state of the crystal).

Figure 2:
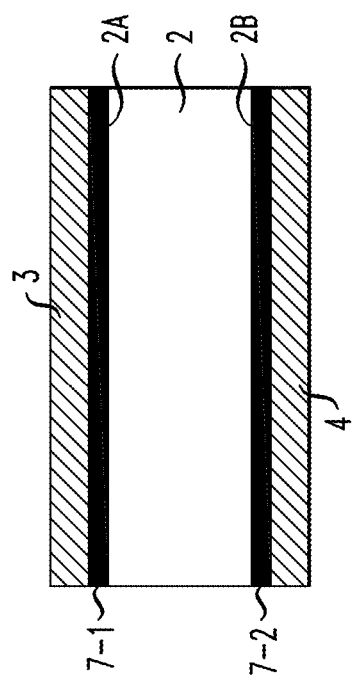
FIG. 2 is a side view of an exemplary crystal, and electrode configuration for the prior art arrangement of FIG. 1.

In practice, electrodes 3 and 4 are typically attached to crystal element 2 via conductive layers formed on top and bottom surfaces 2A and 2B of crystal 2. FIG. 2 is a cut-away side view of this typical arrangement, where a first layer of conductive material 7-1 (such as, for example, a solder material) is disposed to cover surface 2A of crystal material 2, with electrode 3 then contacting conductive layer 7-1. A second layer of conductive material 7-2 is disposed to cover surface 2B of crystal 2, with electrode 4 contacted to layer 7-2. This inclusion of conductive layers 7-1 and 7-2 directs heat and acoustic energy away from crystal 2, while also providing the necessary electrical contact to the crystal material.

As mentioned above, voltages on the order of 3000V are required to create electric fields in the crystal elements used in these modulator structures (the voltages may be slightly higher or lower, depending on the dimensions of the crystal, but in any case will be thousands of volts). The presence of these high voltages cause undesirable arcing and corona that can destroy the crystal and thus lead to failure of the modulator.

The present invention addresses the concerns described above by utilizing dielectric-coated electrodes in the modulator structure to reduce the possibility of arcing. An exemplary electro-optic modulator device 10 formed in accordance with the present invention is shown in cross-section in FIG. 3. Electro-optic modulator 10 is shown as utilizing, a non-centrosymmetric crystal 12 (e.g., CdTe) that exhibits the required birefringent effect. A first electrode 14 is shown as coupled to, a top surface 12-1 of crystal 12 and a second electrode 16 is shown as coupled to a bottom surface 12-2 of crystal 12. Typically, the modulator is operating in, short pulse mode and, as a result, will not generate a large amount of heat as a function of time. Thus, it has been found that it is not necessary to provide a heat transfer mechanism (such as conductive layers 7, FIG. 2) within the structure. Typically, electrodes 14, 16 may comprise any electrically-conductive material, such as a carbon-based material, a transitional metal-based material (i.e., Group IB, Group IIB, Group IVB, Group VB, Group VIB, Group VIIB, and Group III), a Group IVA metal, and any alloy thereof.

In accordance with the present invention, a coating 20 of a dielectric material is disposed to cover all exposed surfaces of electrodes 14 and 16. This is represented as a first coating 20-1 disposed to cover the exposed surfaces of first electrode 14 and a second coating 20-2 disposed to cover the exposed surfaces of second electrode 16. Since the dielectric is an excellent insulator, the presence of a dielectric coating on the exposed surfaces of electrodes 14, 16 prevents the formation of corona. A typical dielectric that may be used as a coating (e.g., a Teflon® brand film) exhibits a breakdown voltage on the order of 3000 volts/0.025 mm. Thus, a configuration where the electrodes are coated with a dielectric layer having a thickness in the range of about 0.020 mm to 0.040 mm (preferably, about 0.025 mm) is sufficient to eliminate the formation of corona. Experience indicates that instantaneous arcing will ultimately occur at voltages above 10,000 volts—a significant increase over the prior art "bare electrode" configuration. Other suitable dielectric materials that may be used as an electrode coating include the various resins and polymers utilized in prevention of corona and arcing, such as "corona dope", silicon, epoxy potting materials, polyurethane, acrylics, and the like. In general, the dielectric coating may comprise an organic polymer; an oxygen-containing, nitrogen-containing, sulfur-containing, or phosphorus-containing hydrocarbon polymer; a halogenated hydrocarbon polymer (particularly, a fluorinated hydrocarbon polymer, such as PTFE, or the like); inorganic polymers such as polysiloxanes; ceramics; glasses, etc.

In accordance with the present invention, therefore, the coating of the exposed surfaces of electrodes 14, 16 with a dielectric material allows for an increase in the applied voltage, while greatly reducing the formation of corona and corrosive ozone, as well as reducing the potential for arcing and acoustic vibration. It is well-known that higher electric fields are known to exist on each end of the crystal, making those areas the most likely locations for the origin of arcing. The presence of the dielectric coating in the corners of these edges (shown as locations 20-C in FIG. 3) is considered to reduce arcing.

Figure 3:
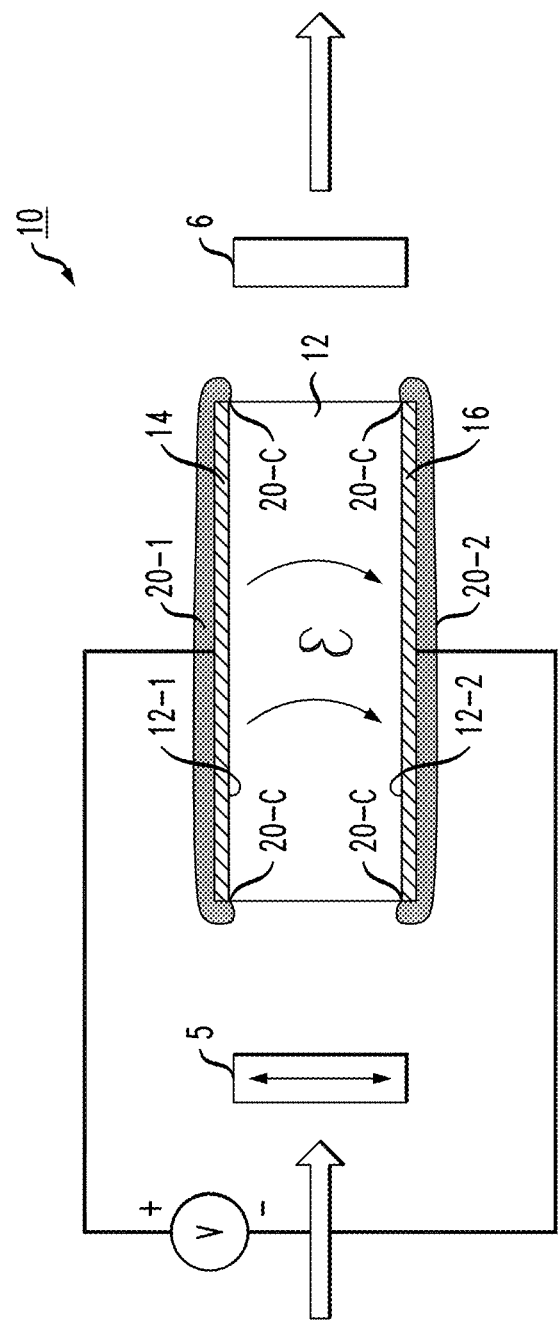
FIG. 3 illustrates an exemplary electro-optic modulator formed in accordance with the present invention, with this embodiment maintains the electrodes in contact with, the crystal and applies a dielectric coating to only the exposed surfaces of the electrodes.
Figure 4:
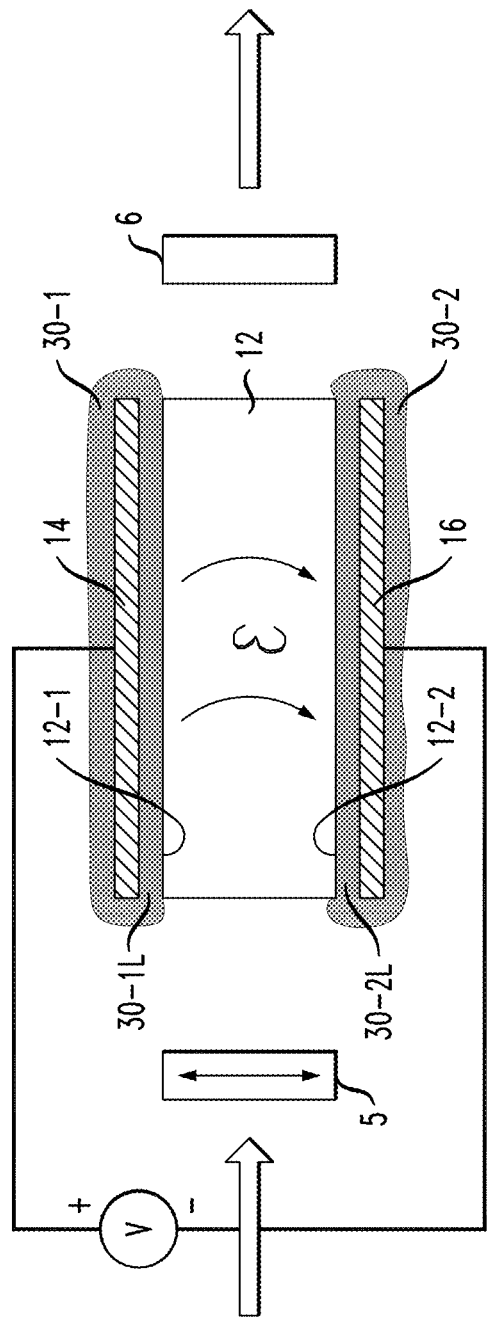
FIG. 4 illustrates an alternative embodiment of the present invention, in this case where the electrodes are disposed in a spaced-apart relationship with the crystal and the electrodes are completely encapsulated within a dielectric material, creating capacitively-coupled connections to the crystal.

In accordance with the present invention, the coating of the electrodes with a dielectric material may comprise various arrangements. In the embodiment of FIG. 3, the exposed surfaces of the electrodes are covered. Another embodiment of the present invention is shown in FIG. 4. In this case, electrodes 14 and 16 are completely encapsulated by a dielectric material 30. In the illustration of FIG. 4, the complete encapsulation is designated by the material regions 30-1 and 30-2, shown as covering electrodes 14 and 16, respectively. By completely encapsulating the electrodes, the problematic edge locations will be covered by a dielectric film, thus increasing the breakdown voltage as compared to "air" (i.e., exposed edges) of the prior art.

Figure 5:
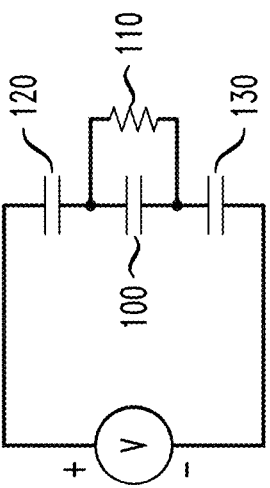
FIG. 5 is a schematic diagram representative of the arrangement of FIG. 4.

The inclusion of dielectric material regions 30-1 and 30-2 is shown as creating a capacitive-based coupling arrangement between crystal 12 and electrodes 14, 16. The net electrical, equivalent of the structure of FIG. 4 is shown in FIG. 5. Here, crystal material 12 is represented by a parallel combination of a first capacitor 100 and a resistor 110. In series with this parallel combination is a pair of connective capacitors, a first connective capacitor 120 formed by the combination of electrode 14, dielectric "layer" 30-1L, and crystal 12, and a second connective capacitor 130 formed by the combination of electrode 16, dielectric "layer" 30-2L and crystal 12. Simply stated, the equivalent circuit of a coated electrode modulator of this alternative embodiment of the present invention is therefore a series connection of three capacitors (capacitors 100, 120 and 130).

In accordance with this circuit configuration, the voltage $V_{XAL}$ created across crystal 12 in the presence of an input voltage pulse Vp can be expressed as follows:

$$V_{XAL} = \frac{V_P}{1 + \frac{C_{XAL}}{O.5C_{FILM}}}, \qquad (1)$$

where $C_{XAL}$ is the capacitance associated with crystal 2 and $C_{FILM}$ is the capacitance associated with the provision of a dielectric film between the electrode and the crystal.

Figure 6:
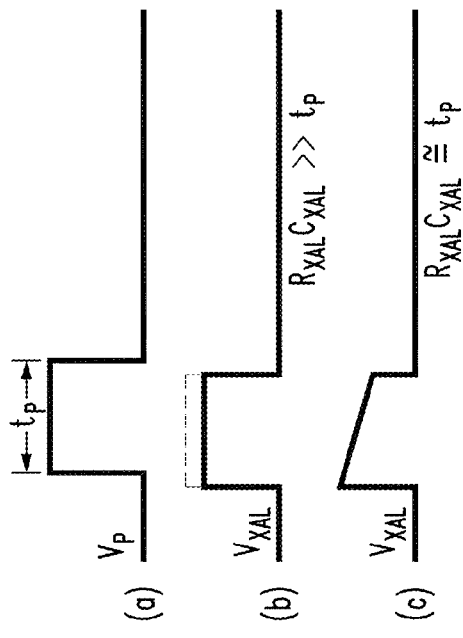
FIG. 6 is a timing diagram illustrating the application of a high-voltage pulse to the configuration of FIG. 4.

When a voltage pulse Vp is applied between electrodes 14 and 16 at t=0, the voltage across crystal 12 will be as shown in plot (a) of FIG. 6. Inasmuch as the values of capacitors 120 and 130 are controlled by the thickness of dielectric layers 30-1 and 30-2, a relatively thin layer allows for a larger voltage to be supported across crystal 12. If the duration of the pulse is relatively short with respect to the RC time constant of capacitor 100, the voltage across capacitor 100 will exhibit little decay over time, as shown in plot (b). On the other hand, if the duration of the pulse is relatively the same as the RC time constant, some pulse decay will occur, as shown in plot (c). In any case, the voltage $V_{XAL}$ appearing across the crystal will be slightly less than the voltage of the applied pulse $V_P$, depending on the capacitance associated with the electrodes compared to the capacitance of the crystal material itself. This reduction in voltage will result in a lower level of modulation; however, inasmuch as the input voltage can be safely increased, this increase will easily compensate for the presence of the capacitances, while still providing a reduced opportunity for arcing.

Figure 7:
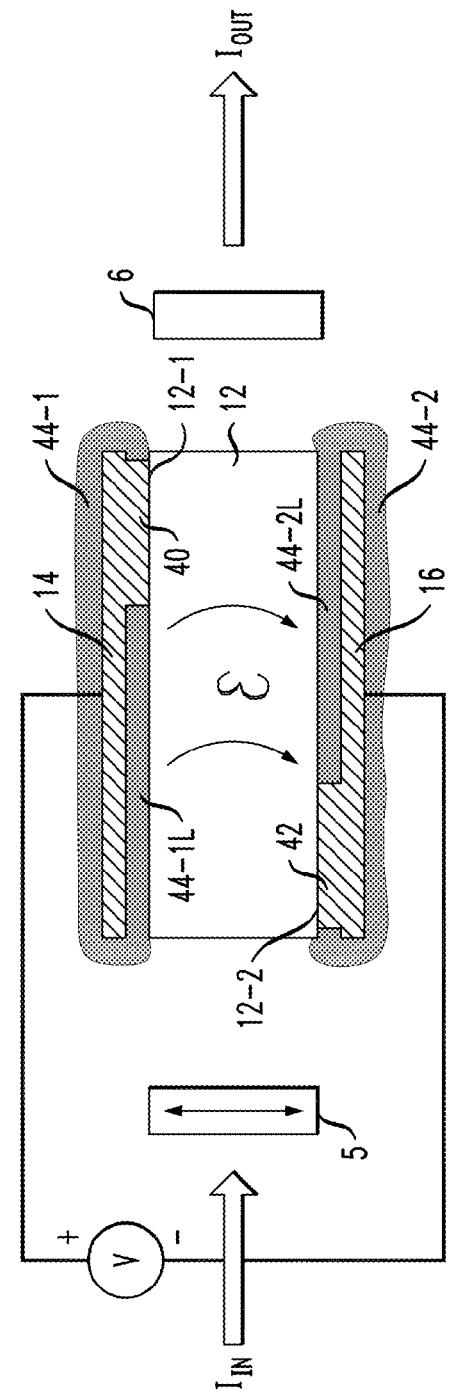
FIG. 7 illustrates yet another embodiment of the present invention, in this case where each electrode includes a section in direct contact with the crystal and another section that is capacitively-coupled to the crystal.

In yet another embodiment of the present invention, a combination of partially and fully encapsulated electrodes may be used, as shown in FIG. 7. In this exemplary configuration of this embodiment, a first conductive layer 40 is formed along a portion of top surface 12-1 of crystal 12 and electrode 14 is disposed over first conductive layer 40 (alternatively, conductor 14 may be configured to exhibit this topology). A second conductive layer 42 is formed along a portion of bottom surface 12-2 of crystal 12, with electrode 16 disposed over and electrically coupled to second conductive layer 42.

Also shown in FIG. 7 is a first dielectric coating 44-1 that is disposed to cover all exposed surfaces of electrode 14 and first conductive layer 40. A second dielectric coating 44-2 is similarly disposed to cover all exposed surfaces of electrode 16 and second conductive layer 42. By maintaining direct electrical contact, with at least a portion of the interface between the crystal and electrodes being coated, the increased breakdown voltage and lower modulation level resulting from the presence of the dielectric can be adjusted. Providing both the encapsulated and partially encapsulated electrodes in the manner shown in FIG. 7 produces a configuration whereby the breakdown voltage is decreased when compared to the prior art bare electrode configuration, while the voltage seen by the crystal ($V_{XAL}$) is increased.

Example for Configuration of FIG. 4

The capacitance of a CdTe rod that is 50 mm long and 5 mm thick, with a dielectric constant of 10, is on the order of 4.425 pF—defined as $C_{XAL}$.

The capacitance of a Teflon® brand film of dimensions 50 mm×5 mm (0.001 inch thick), with a dielectric constant of 2.2, is on the order of 182.923 pF—defined as $C_{FILM}$.

Presuming an applied voltage pulse $V_P$ of 5000, and using the relationship of equation (1), which is repeated here for the sake of convenience, the peak voltage $V_{XAL}$ across a crystal with completely encapsulated electrodes is given by the following:

$$V_{XAL} = V_P \cdot \frac{1}{1 + \frac{C_{XAL}}{O.5C_{FILM}}}$$

$$= 5000 \cdot \frac{1}{1 + \frac{4.425}{0.5 * 182.923}}$$

$$= 4769 \text{ volts.}$$

When using the "alternating configuration" of FIG. 7, the value of $V_{XAL}$ is found to increase to about 4882 volts.

In terms of specific geometries, the electrodes may be formed to exhibit the same shape as the surface of the crystal material (generally, rectangular). However, any irregular shape may be used, as long as one "flat" surface is provided to lie substantially in parallel with the associated surface of the crystal material. As noted above, the material choices for the dielectric coating are many, and are thus necessarily design considerations for the developer's selection as best appropriate for a particular purpose. With respect to a suitable crystal material, non-centrosymmetric crystals that exhibit a sufficient electro-optic effect to rotate the polarization state of a propagating optical signal may be used, presuming that the crystal is also highly transmissive at the wavelength of interest. For the application in $CO_2$ laser systems, an optical wavelength of 10.6 µm is typical.

It should be recognized that a number of variations of the above-identified embodiments will be obvious to one of ordinary skill in the art in view of the foregoing description. Accordingly, the inventive scope is not to be limited by those specific embodiments and methods of the present invention shown and described herein. Rather, the scope of the invention is to be defined by the following claims and their equivalents.

What is claimed is:

1. An electro-optic modulator comprising:
   a non-centrosymmetric crystal that exhibits changes in internal birefringence in response to an applied voltage, the non-centrosymmetric crystal having opposing major surfaces; and
   electrodes coupled to the opposing major surfaces of the non-centrosymmetric crystal with at least one electrode including a dielectric coating over at least a portion of its external surface, the coating of a thickness sufficient to reduce arcing in the presence of voltages in excess of 1000 volts.

2. The electro-optic modulator as defined in claim 1 wherein the electrodes include a first electrode covering a first major surface of the non-centrosymmetric crystal and a second electrode covering a second, opposing major surface of the non-centrosymmetric crystal.

3. The electro-optic modulator as defined in claim 2 wherein exposed surfaces of the first and second electrodes are covered with the dielectric coating.

4. The electro-optic modulator as defined in claim 1 wherein the electrodes include at least one electrode disposed in a spaced-apart relationship with a first major surface of the non-centrosymmetric crystal, the at least one electrode encapsulated within the dielectric coating, creating a capacitive connection between the at least one electrode and the first major surface of the non-centrosymmetric crystal.

5. The electro-optic modulator as defined in claim 1 wherein the electrodes comprise a pair of electrodes disposed in a spaced-apart relationship with the opposing major surfaces of the non-centrosymmetric crystal, each electrode encapsulated with the dielectric coating.

6. The electro-optic modulator as defined in claim 1 wherein the electrodes are configured as partially encapsulated, with a first electrode including a first section in contact with a major surface of the non-centrosymmetric crystal and an adjacent second section spaced-apart from the non-centrosymmetric crystal with a portion of the dielectric coating disposed therebetween.

7. The electro-optic modulator as defined in claim 1 wherein the electrodes are configured as partially encapsulated, with a first electrode including a first section in contact with a first major surface of the non-centrosymmetric crystal and an adjacent second section spaced-apart from the first major surface of the non-centrosymmetric crystal with a portion of the dielectric coating disposed therebetween, and a second electrode including a first section in contact with a second, opposing major surface of the non-centrosymmetric crystal and an adjacent second section spaced apart from the second major surface of the non-centrosymmetric crystal with a portion of the dielectric coating disposed therebetween.

8. The electro-optic modulator as defined in claim 1 wherein the non-centrosymmetric crystal comprises CdTe.

9. The electro-optic modulator as defined in claim 1 wherein the dielectric coating exhibits a breakdown voltage of less than about 0.003V/mm.

10. The electro-optic modulator as defined in claim 1 wherein the dielectric coating is formed to exhibit a thickness in the range of about 0.020 mm to 0.040 mm.

11. The electro-optic modulator as defined in claim 10 wherein the dielectric coating is formed to exhibit a thickness on the order of about 0.025 mm.

12. The electro-optic modulator as defined in claim 1 wherein the dielectric coating is selected from the group consisting of resins and polymers that prevent corona and arcing.

13. The electro-optic modulator as defined in claim 1 wherein the dielectric coating is selected from the group consisting of: an organic polymer; an oxygen-containing, nitrogen-containing, sulfur-containing, or phosphorus-containing hydrocarbon polymer; a halogenated hydrocarbon polymer; inorganic polymers; ceramics and glasses.

14. The electro-optic modulator as defined in claim 1 wherein the electrodes are formed of a material selected from the group consisting of: carbon-based materials, transitional metal-based materials (i.e., Group IB, Group IIB, Group IVB, Group VB, Group VIB, Group VIIB, and Group III), Group IVA metals, and any alloy thereof.

* * * * *